United States Patent
Zhao et al.

(10) Patent No.: US 6,332,069 B1
(45) Date of Patent: Dec. 18, 2001

(54) APPARATUS AND METHOD FOR GROUPING CARRIERS TO MINIMIZE THE OCCURRENCE OF CALL BLOCKING IN A SATELLITE-BASED COMMUNICATIONS NETWORK

(75) Inventors: Wei Zhao, Germantown; Steven Arnold, Ijamsville, both of MD (US); Anthony Noerpel, Lovettsville, VA (US); Dave Roos, Boyds, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/244,970

(22) Filed: Feb. 10, 1999

(51) Int. Cl.⁷ .................................................. H04B 7/185

(52) U.S. Cl. ......................... 455/12.1; 455/427; 455/429

(58) Field of Search ................................. 455/12.1, 13.2, 455/63, 427, 429, 13.1, 430, 422, 446; 342/354, 154, 356

(56) References Cited

U.S. PATENT DOCUMENTS

| | | | |
|---|---|---|---|
| 4,256,925 | * 3/1981 | Goode | 370/322 |
| 5,245,634 | 9/1993 | Averbuch | 375/357 |
| 5,307,399 | 4/1994 | Dai et al. | 455/459 |
| 5,415,368 | 5/1995 | Horstein et al. | 455/12.1 |

(List continued on next page.)

FOREIGN PATENT DOCUMENTS

| | | |
|---|---|---|
| 0046831 | 3/1982 | (EP) . |
| 0162478 | 11/1985 | (EP) . |
| 0748064 | 12/1985 | (EP) . |
| 0475698 | 3/1992 | (EP) . |

(List continued on next page.)

OTHER PUBLICATIONS

Fingerle et al., "GSM Signalisierung in der Praxis", ITG-Fachbericht, pp. 423–432, No. 124, Sep. 1993.

Garg et al., "Cost Effective Personal Communications Using Geo–Synchronous Satellite", 1996 IEEE International Conference on Personal Wireless Communications Proceedings and Exhibition—Future Access (Cat. No. 96TH8165), 1996.

(List continued on next page.)

Primary Examiner—Dwayne Bost
Assistant Examiner—Sonny Trinh
(74) Attorney, Agent, or Firm—John T. Whelan; Michael W. Sales

(57) ABSTRACT

An apparatus and method, for use in a satellite-based communications network, for minimizing blocking of communication between the network and access terminals resulting from differences in the signal propagation delays for the access terminals due to their different locations within a coverage area serviced by a spot beam generated by a satellite in the network. The apparatus includes a spot beam segregator which segregates a coverage area of the spot beam into at least one coverage zone based on the maximum and minimum propagation delay experienced by access terminals within the coverage area of the spot beam. The apparatus further includes a carrier grouper which groups the carrier into a number of groups corresponding to the number of offset zones, and assigns each carrier group to a respective one of the coverage zones. The number of carriers assigned to each carrier group is proportional to the estimated number of access terminals located in the respective coverage zone to which the carrier group is assigned. The apparatus assigns a respective burst offset to each respective coverage zone so that signals being transmitted by the satellite and access terminals within the coverage zone are transmitted in accordance with the same burst offset. Accordingly, burst signals are arranged efficiently in the TDMA time frames being transmitted over the carriers between the satellite and access terminals, which therefore minimizes call blocking.

28 Claims, 5 Drawing Sheets

U.S. PATENT DOCUMENTS

| | | | |
|---|---|---|---|
| 5,548,801 | * 8/1996 | Araki et al. | 455/13.1 |
| 5,551,058 | 8/1996 | Hutchenson et al. | 455/429 |
| 5,589,837 | 12/1996 | Soleimani et al. | 342/359 |
| 5,630,016 | 5/1997 | Swaminathan et al. | 704/228 |
| 5,678,228 | 10/1997 | Soleimani et al. | 455/343 |
| 5,706,329 | 1/1998 | Foladare et al. | 455/459 |
| 5,710,982 | 1/1998 | Laborde et al. | 455/69 |
| 5,717,686 | 2/1998 | Schiavoni | 370/321 |
| 5,745,524 | 4/1998 | Hull | 375/244 |
| 5,758,256 | 5/1998 | Berry et al. | 456/72 |
| 5,794,160 | 8/1998 | Ezuriko | 455/557 |
| 5,881,101 | 3/1999 | Furman et al. | 375/217 |
| 5,920,284 | 7/1999 | Victor | 455/12.1 |
| 5,940,753 | 8/1999 | Mallinckrodt | 455/422 |
| 5,943,606 | 8/1999 | Kremm et al. | 455/12.1 |
| 5,956,646 | 9/1999 | Kolev et al. | 455/502 |
| 5,966,662 | 10/1999 | Murto | 455/458 |
| 5,987,319 | 11/1999 | Hermansson et al. | 455/422 |
| 5,991,598 | * 1/1999 | Nawata | 455/13.1 |
| 5,991,642 | 11/1999 | Watanabe et al. | 455/560 |
| 6,115,366 | * 9/2000 | Campanella et al. | 370/319 |
| 6,125,261 | * 9/2000 | Anselmo et al. | 455/427 |
| 6,150,977 | * 11/2000 | Wilcoxson et al. | 342/355 |

FOREIGN PATENT DOCUMENTS

| | | | |
|---|---|---|---|
| 0506255 | 9/1992 | (EP) . | |
| 0637142 | 2/1995 | (EP) . | |
| 0662758 | 7/1995 | (EP) . | |
| 0663736 | 7/1995 | (EP) . | |
| 0668667 | 8/1995 | (EP) . | |
| 0748064 | 12/1996 | (EP) . | |
| 790714-A2 | * 8/1997 | (EP) | H04B/7/185 |
| 4045617 | 2/1992 | (JP) . | |
| 8607512 | 12/1986 | (WO) . | |
| 9102436 | 2/1991 | (WO) . | |
| 9612352 | 4/1996 | (WO) . | |
| 9718650 | 5/1997 | (WO) . | |
| 9723065 | 6/1997 | (WO) . | |
| 9724891 | 7/1997 | (WO) . | |
| 9839857 | 9/1998 | (WO) . | |

OTHER PUBLICATIONS

Johnny N. Ku, "Strategies on the Immediate Assignment Procedure Within the GSM Call Setup Scenario", pp. 786–789, IEEE, 1992.

Annoni et al., "Access and Synchronization Schemes in the ESA OBP System", Countdown to the New Millennium, Phoenix, pp. 206–211, Dec. 2, 1991, IEEE.

* cited by examiner

APPARATUS AND METHOD FOR GROUPING CARRIERS TO MINIMIZE THE OCCURRENCE OF CALL BLOCKING IN A SATELLITE-BASED COMMUNICATIONS NETWORK

CROSS-REFERENCE TO RELATED APPLICATIONS

Related subject matter is disclosed in a copending U.S. patent application of Chandra Joshi, Anthony Noerpel, Neeraj Tewari, Gerald Stelzer, David Roos and Chi-Jiun Su entitled "System and Method for Implementing Terminal to Terminal Connections via a Geosynchronous Earth Orbit Satellite", Serial No. 09/115,098, filed on Jul. 13, 1998, the entire contents of which is expressly incorporated herein by reference.

BACKGROUND OF THE INVENTION

1. Field of the Invention

The present invention relates to an apparatus and method, for use in a satellite-based communications network, for minimizing blocking of communication between the network and access terminals resulting from differences in the signal propagation delays for the access terminals due to their different locations within a coverage area serviced by a spot beam generated by a satellite in the network. More particularly, the present invention relates to an apparatus and method for minimizing such communication blocking by segregating the coverage area of the spot beam into at least one coverage zone, segregating the communication carriers available for the spot beam into a number of carrier groups corresponding to the number of coverage zones, and assigning to each carrier group a specific burst offset time period in accordance with which communication bursts are transmitted over carriers in the carrier group between the network and access terminals located within the coverage zone serviced by the carrier group.

2. Description of the Related Art

A satellite communications network, such as a geosynchronous earth orbit mobile communications network, comprises at least one geosynchronous earth orbit satellite, a ground-based advanced operations center (AOC) and spacecraft operations center (SOC) associated with the satellite, at least one ground-based gateway station (GS), and at least one access terminal (AT), which is typically a hand-held or vehicle mounted mobile telephone. The satellite enables the access terminal to communicate with other access terminals, or with other telephones in the terrestrial public switched telephone network (PSTN), via the gateway stations under the control of the gateway stations. The AOC provides system-wide resource management and control functions for its respective satellite, and the SOC controls on-orbit satellite operations for its respective satellite.

To communicate with access terminals, the network controls a satellite to generate at least one spot beam, which is typically an L-band frequency signal, toward the surface of the earth. Each spot beam covers a predetermined geographic region of the earth, thus enabling access terminals within that region to communicate with the network via communications signals transmitted to the satellite over a carrier selected from a plurality of carriers assigned to the spot beam.

For example, when an access terminal places a call to another access terminal or to a terrestrial telephone, the access terminal generates and transmits a channel request message on a random access channel (RACH) at a frequency assigned to the spot beam to the satellite. Typically, a channel request message includes data representing a random number, which is used as an identifier for the access terminal sending the channel request message, as well as contention resolution and timing synchronization information.

The satellite includes a receiver which, under the control of the network, establishes time frames of a particular duration during which channel request messages are received. When a channel request message is received by the satellite during a particular time frame, and is thus received by the network, the network transmits data via the satellite to the access terminal to establish a communication link between the access terminal and network. The data includes access channel information (access grant channel information) indicating the frequencies of the carriers over which communication between the network and the access terminal is to occur during the call. Typically, a carrier of a particular frequency is assigned to service transmission of communications from the satellite to the access terminal, and a carrier of another frequency is assigned to service transmission of communications from the access terminal to the satellite. Hence, a pair of carriers service communication between the satellite and an access terminal.

Communication between the network and access terminal occurs in the form of signal bursts of a predetermined duration which are transmitted over the carrier pair designated by the access grant channel information between the access terminal and satellite. Signal bursts transmitted from the satellite to the access terminal, along with signal bursts being transmitted to other access terminals, if any, also assigned to a carrier in the carrier pair, are transmitted over the carrier in a time-division multiple access (TDMA) manner. That is, each signal burst being transmitted from the satellite to the access terminal is time-multiplexed with the signal bursts being transmitted by the satellite to the other access terminals in a TDMA frame of a particular duration, and transmitted over the carrier.

A TDMA frame includes a plurality of timeslots, which become occupied by the time-multiplexed signal bursts being transmitted. For example, a TDMA frame can include 24 timeslots, and each signal burst can be 3 timeslots long. Accordingly, a 24 timeslot TDMA frame can contain up to eight signal bursts which are being transmitted to eight respective access terminals (i.e., 8 signal bursts of 3 timeslots each), with each burst occupying three specific sequential timeslots of the TDMA frame. Naturally, a 24 timeslot TDMA frame can accommodate only four signal bursts which are each 6 timeslots in length, with each signal burst occupying six specific sequential timeslots of the TDMA frame.

Upon receiving its appropriate signal burst transmitted from the satellite, each access terminal transmits a signal burst back to the satellite in a TDMA frame over the other carrier in the carrier pair. An access terminal begins transmitting its respective signal burst at an appropriate instant in time after the instant in time at which the access terminal began receiving its respective signal burst transmitted from the satellite as described above. Because the transmitter/receiver of an access terminal is a typically a half-diplexer which permits only signal transmission or signal reception at any given time, the time period in which the access terminal transmits a signal burst can not overlap the time period in which the access terminal is receiving a signal burst.

Specifically, each access terminal begins transmitting its respective signal burst at an appropriate time after receiving a signal burst, which will properly position the signal burst in the TDMA frame so as not to overlap any other signal burst being transmitted by another access terminal, and so that the signal burst will be received at the satellite at the appropriate receive time. An access terminal determines when transmission of the signal burst should begin based on the amount of burst offset required at the satellite, which is the desired duration of time which should elapse from the start of transmission by the satellite of a signal burst to the access terminal and the subsequent start of receipt by the satellite of a signal burst transmitted from that access terminal. The access terminal also takes into account an estimated time which will elapse between the instant when a signal burst is transmitted by the access terminal and the instant when that signal burst is received by the satellite, which is known as the propagation delay.

An access terminal estimates the propagation delay for a distance measured from its location on the earth's surface to the satellite, which is orbiting at about 22,000 miles above the earth's surface. Because the distance from the surface of the earth at the equator to the satellite is less than the distance from the surface of the earth in the extreme northern and southern hemispheres to the satellite, the propagation delay for a signal burst sent from an access terminal close to the equator is less than that for a signal burst sent from an access terminal in, for example, northern Europe. An access terminal can include global positioning system (GPS) equipment, or any other suitable device, which enables it to determine its location on the earth's surface, and thus estimate its propagation delay based on an estimated distance between the location of the access terminal and the satellite.

If the propagation delays for all access terminals being serviced by a particular spot beam were equal, each access terminal would be able set its signal burst transmitting time based on the burst offset for the satellite to assure that the transmitted signal burst would be positioned properly in a TDMA frame and reach the satellite during the appropriate time period. However, because the access terminals are typically at different locations within the spot beam and accordingly, their distances to the satellite differ, they experience different propagation delays.

Therefore, although an access terminal at one edge of the spot beam may be able to base its signal burst transmission timing on the satellite burst offset and experience proper signal burst transmission, an access terminal at the opposite edge of the spot beam may need to base its signal burst transmission timing on a different burst offset value to compensate for the different propagation delay time. In this event, the network may need to control the satellite to set different burst offsets for communication with the access terminals having different propagation delays. Also, movement of an access terminal within the spot beam during communication can alter the propagation delay for that access terminal by an amount large enough to require a corresponding change in burst offset for communication with that access terminal.

As stated above, the use of different burst offsets for communication with access terminals at different locations within the spot beam generally will be sufficient to assure that the signal bursts transmitted from the satellite to the access terminals will reach the access terminals during the appropriate receiving times and vice-versa However, if the access terminals base their respective signal burst transmission timing on different burst offsets, the signal bursts transmitted may not be properly positioned within the TDMA frame to utilize the TDMA frame most efficiently.

That is, the transmitted signal bursts may be distributed in the timeslots of the TDMA time frame such that unused time slots are present between adjacent transmitted signal bursts. In this event, the TDMA time frame is unable to accommodate the maximum amount of time bursts (e.g., eight 3-timeslot long bursts). Accordingly, a transmitted signal burst from one or more access terminals, which would normally be capable of fitting in the TDMA time frame if the transmission bursts were arranged efficiently, is unable to be transmitted in the IDMA time frame over the carrier. This phenomenon is known as "call blocking", in which an access terminal is prevented from transmitting a signal burst in a TDMA time frame over a particular selected carrier, and thus must use a different carrier for transmission. As can be appreciated, the call blocking phenomenon reduces the amount of access terminals that can utilize a particular carrier for communication with the network. Furthermore, because a spot beam is assigned with a finite number of carriers, the overall amount of access terminals that can be serviced by that spot beam is consequentially reduced.

Accordingly, a need exists for a system which minimizes the occurrence of call blocking in a satellite-based communications network by providing efficient multiplexing of signal bursts in the TDMA time frames being transmitted between a satellite and access terminals over carriers assigned to the satellite-generated spot beam servicing the access terminals.

SUMMARY OF THE INVENTION

An object of the present invention is to provide an apparatus and method, for use in a satellite-based communications network, for minimizing call blocking in the network by efficiently multiplexing signal bursts in their respective TDMA time frames being transmitted between a satellite and access terminals over carriers servicing the access terminals.

Another object of the present invention is to provide an apparatus and method, for use in a satellite-based communications system, for minimizing call blocking in the network by grouping the carriers available to a spot beam into an appropriate number of groups which each service a particular zone of coverage of the spot beam, so that signal burst can be transmitted more efficiently over the carriers between the satellite and access terminals.

A further object of the invention is to provide an apparatus and method, for use with a satellite-based communications network, for minimizing call blocking in the network by enabling bursts to be transmitted from multiple access terminals located within a certain portion of the spot-beam coverage area in accordance with the same burst offset defined at the satellite to result in a more efficient distribution of the bursts within a TDMA time frame which is transmitted over a carrier to the satellite.

These and other objects of the present invention are substantially achieved by providing an apparatus and method, for use in a satellite-based communication network, for grouping a plurality of carriers assigned to a spot beam generated by a satellite in the network into a number of groups, each of which servicing access terminals located in particular coverage zones of the spot beam. The apparatus comprises a spot beam segregator which segregates a coverage area of the spot beam into at least one coverage zone, and a carrier grouper which groups the carrier into a number of groups corresponding to the number of offset zones, and assigns each of the carrier groups to a respective one of the coverage zones. The spot beam is segregated based on the maximum and minimum propagation delay experienced by access terminals within the coverage area of the spot beam.

The number of carriers assigned to each carrier group is proportional to the estimated number of access terminals located in the respective coverage zone to which the carrier group is assigned. The apparatus further includes a burst offset assignor which assigns a respective burst offset to each respective coverage zone so that signals being transmitted by the satellite and access terminals within the coverage zone are transmitted in accordance with the same burst offset. Accordingly, burst signals are arranged efficiently in the TDMA time frames being transmitted over the carriers between the satellite and access terminals, which therefore minimizes call blocking.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
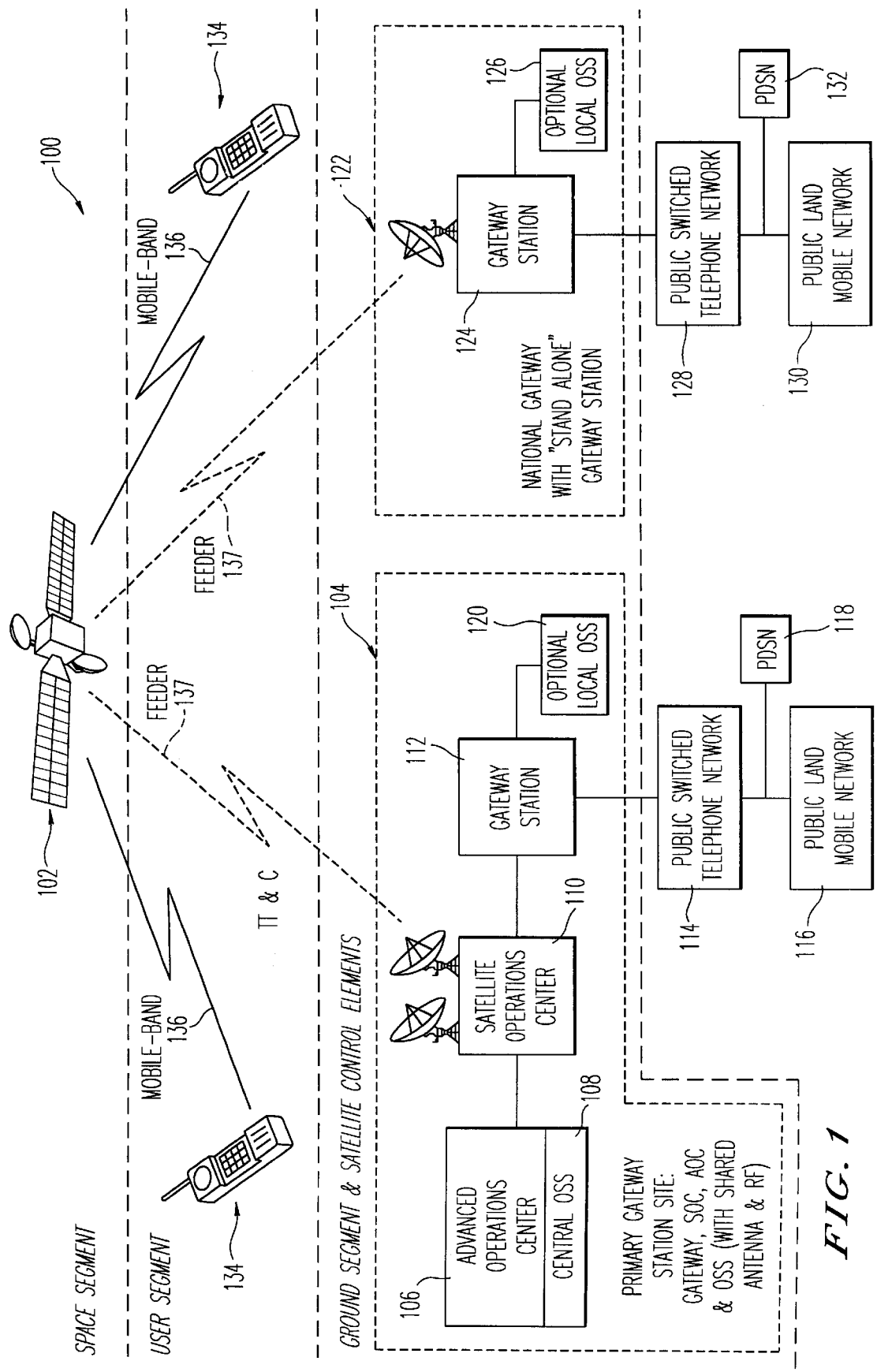
FIG. 1 is a schematic block diagram of a satellite communications network according to an embodiment of the present invention.

FIG. 1 illustrates an example of satellite communications network 100 according to an embodiment of the present invention. The satellite communications network includes at least one satellite 102 which is, for example, a geosynchronous earth orbit satellite, and at least one primary gateway station site 104. The primary gateway station site 104 comprises an advanced operations center (AOC) 106, a central operations support system (OSS) 108, a satellite operation center (SOC) 110, and a gateway station 112, which provides access to a public switched telephone network (PSTN) 114. The PSTN 114 provides access to the public land mobile network (PLMN) and public switched data network (PSDN) 118. Optionally, the gateway station 112 can include a local operations support system (LOSS) 120.

The network 100 also includes a national gateway 122 comprising a gateway station 124 which optionally includes a local OSS 126. The national gateway 122 provides access to a PSTN 128, which provides access to a PLMN 130 and a PSDN 132. Further details of the primary gateway station site 104 and national gateway station site 122 and their respective components and operations are set forth in copending U.S. patent application Ser. No. 09/115,098, referenced above.

Figure 2:
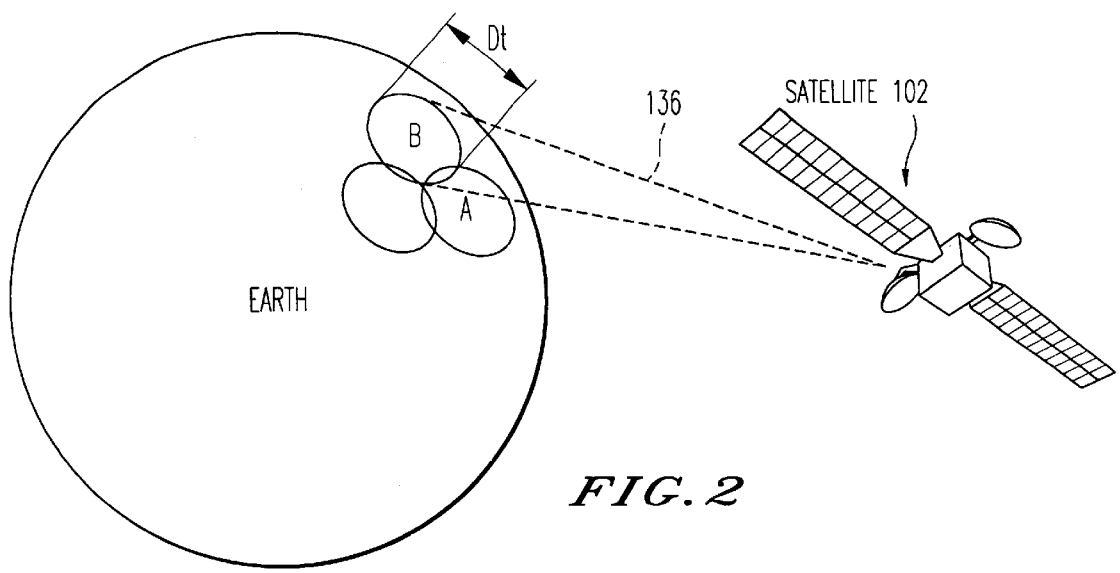
FIG. 2 is a schematic diagram illustrating a satellite in the satellite communications network shown in FIG. 1, projecting a plurality of spot beams onto different regions on the surface of the earth.

The satellite communications network 100 further includes at least one access terminal 134, such as a hand-held telephone or vehicle-mounted telephone, which can operate in the Geosynchronous earth orbit satellite communications network 100 discussed above, as well as in a GSM cellular telephone network. As shown in FIG. 2, the satellite 102 generates at least one spot beam 136 onto a predetermined geographic location of the surface of the earth. In this example, the satellite 102 generates a plurality of spot beams 136 onto different respective geographic locations on the earth's surface. An access terminal 134 communicates with the satellite over, for example, an L-band frequency designated by a particular spot beam 136 covering an area of the earth at which the access terminal 134 is located. The primary gateway station 102 and national gateway station site 122 each communicate with the satellite 102 over, for example, a Ku-band frequency identified as feeder 137 in FIG. 1. Communications can be originated by an access terminal 134. Alternatively, a call can originate from a telephone serviced by, for example, a PSIN, or from a telephone serviced by a GSM cellular network. Details of the communication and control operations performed by the primary gateway station site 104 and national gateway station site 122 in relation to the satellite 102 and access terminal 134 to establish communication between two access terminals 134, or between an access terminal 134 and a terrestrial terminal such as a telephone serviced by a PSTN 114 or 128, are disclosed in U.S. patent application Ser. No. 09/115,098.

Figure 3:
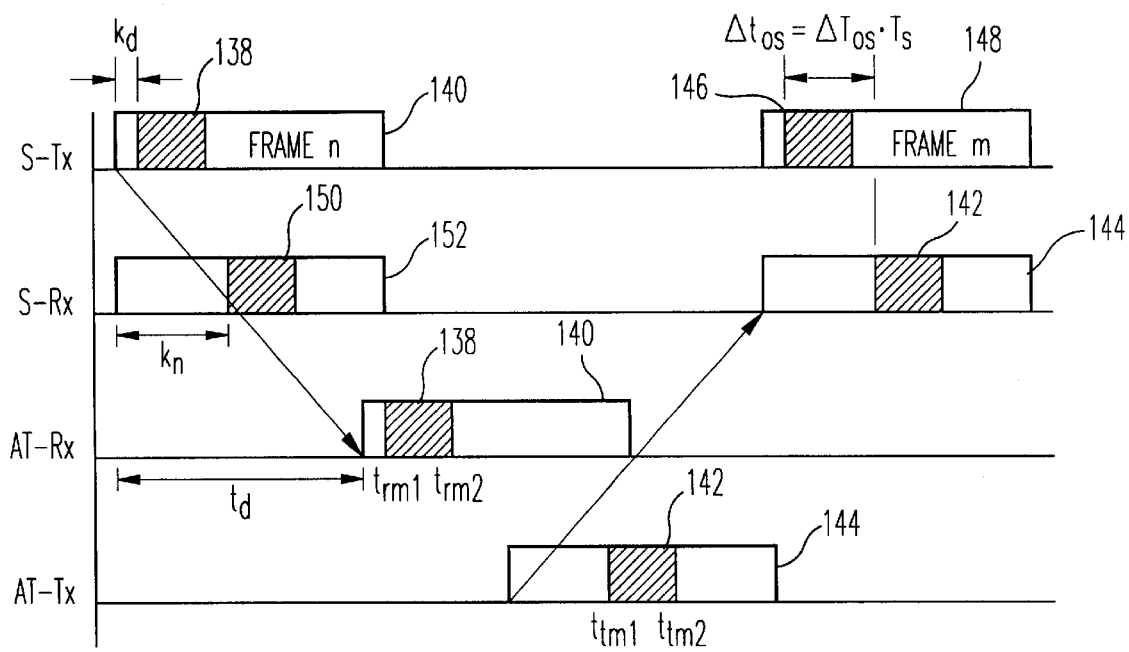
FIG. 3 is a timing diagram illustrating an example of the relationship between a signal burst being transmitted in a TDMA frame from a satellite to an access terminal over a carrier and a signal burst being transmitted in another TDMA frame from the access terminal to the satellite over another carrier.

As discussed in the background section above, communication occurs between the network 100 and the access terminals 134 in the form of signal bursts which are transmitted in TDMA frames over carriers assigned to the spot beam 136 in which the access terminals 134 are located. FIG. 3 is a timing diagram illustrating an example of the relationship between a signal burst 138 being transmitted in a frame 140 from a satellite 102 to an access terminal 134 (see FIG. 1) over a carrier represented by S-Tx at the satellite (which is represented as AT-Rx at the access terminal), and a signal burst 142 being transmitted in another frame 144 from the access terminal 134 to the satellite 102 over another carrier represented by AT-Tx at the access terminal 134 (which is represented by S-Rx at the satellite 102).

In this example, the signal bursts are each 3-timeslots in duration, and each frame is 24-timeslots in duration. However, as discussed above, the signal bursts can have other durations, such as 6-timeframes, 9-timeframes, and so on, and the frames can have different durations as well. Additionally, FIG. 3 shows the time at which signal burst 138 in frame 140 is transmitted by the satellite 102 in relation to another signal burst 146 in frame 148 subsequently transmitted by the satellite 102. Also, the time at which signal burst 142 in frame 144 is received by the satellite 102 is shown in relation to another signal burst 150 in frame 152 which was previously received at the satellite 102. However, for clarity, the frames between frames 140 and 148, and the frames between frames 152 and 144, at the satellite (i.e., shown on carriers S-Tx and S-Rx) have been omitted.

As indicated, $t_d$ represents the propagation delay, in milliseconds, for frame 140 to travel from the satellite 102 to that particular access terminal 134 in accordance with the access terminal's location within the coverage area of the spot beam 136. The same propagation delay $t_d$ also occurs for frame 144 to travel from the access terminal 134 to the satellite 102. As described in more detail below, $k_d$ and $k_u$ represent the mobile downlink and uplink burst positions, respectively, of the signal bursts 138 and 150 in their respective frames 140 and 152. The downlink burst position $k_d$ is generally the same for all signal bursts being transmitted by satellite 102 to that particular access terminal 134. Similarly, the uplink burst position $k_u$ is generally the same for all signal bursts being received by the satellite 102 from that particular access terminal 134.

As also described in more detail below, $t_{rm1}$ and $t_{rm2}$ represent start time and stop time, respectively, of receipt of a signal burst (e.g., signal burst 138) by the access terminal 134. Similarly, $t_{tm1}$ and $t_{tm2}$ represent start time and stop time, respectively, of transmission of a signal burst (e.g., signal burst 142) by the access terminal 134. The term $\Delta t_{os}$ represents the receiving/transmitting burst offset at the satellite 102 in units of milliseconds, $\Delta t_{os}$ represents the receiving/transmitting burst offset measured in timeslots of a frame, and $T_s$ represents the timeslot duration in milliseconds.

For illustrative purposes, FIG. 3 shows frame 140 as including only one signal burst 138. However, as discussed in the background section above, a plurality of access terminals 10 (e.g., up to 8 access terminals) can be assigned to communicate with the satellite 102 over the same carriers (e.g., the carriers represented as S-Tx and S-Rx at the satellite 102). In this event, signal burst 138 being transmitted from the satellite 102 to the access terminal 134, is time-multiplexed with the other signal bursts being transmitted to other access terminals in frame 140.

Figure 4:
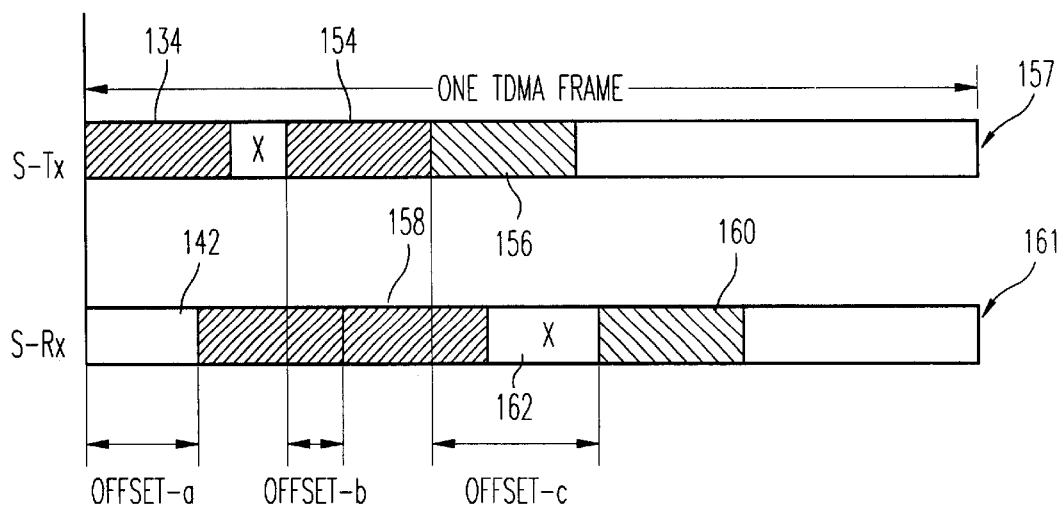
FIG. 4 illustrates an example of a TDMA frame including a plurality of time-multiplexed signal bursts transmitted from a satellite in the network shown in FIG. 1 over a carrier to a plurality of access terminals in relation to a TDMA frame including a plurality of time-multiplexed signal bursts transmitted over another carrier in accordance with different burst offsets from the plurality of access terminals to the satellite.

For example, as shown in FIG. 4, signal burst 138 being transmitted to access terminal 134, along with signal bursts 154 and 156 being transmitted to two other respective access terminals (not shown), are distributed in frame 157 in a time-division multiple access (TDMA) manner and transmitted over carrier S-Tx. Upon receiving its appropriate signal burst transmitted from the satellite 102, each of the three access terminals transmits a signal burst back to the satellite 102 over carrier S-Rx. As discussed in the background section above, the signal bursts (i.e., signal bursts 142, 158 and 160 shown in FIG. 4) are received in a TDMA manner in a frame (i.e., frame 161) at the satellite 102. Each access terminal begins transmitting its respective signal burst at an appropriate time which will properly position the signal burst in the TDMA frame so as not to collide with any other signal burst being transmitted by another access terminal, and so that the signal burst will be received at the satellite at the appropriate receive time.

As further discussed in the background section, because the access terminals are typically at different locations within the spot beam, their respective transmitted signal bursts experience different propagation delays. Accordingly, to meet access terminal reception and transmission guard time requirements, different burst offsets can be assigned to each access terminal to compensate for the differences in propagation delays. However, as shown in FIG. 4, this can result in the signal bursts received at the satellite (i.e., which have been transmitted by the user terminals) being distributed in the TDMA time frame 144 with unused time slots between adjacent received signal bursts (e.g., unused timeslot 162 between signal bursts 158 and 160). In this event, the TDMA time frame is unable to accommodate the maximum amount of time bursts (e.g., eight 3-timeslot long bursts), and call blocking can occur.

Figure 5:
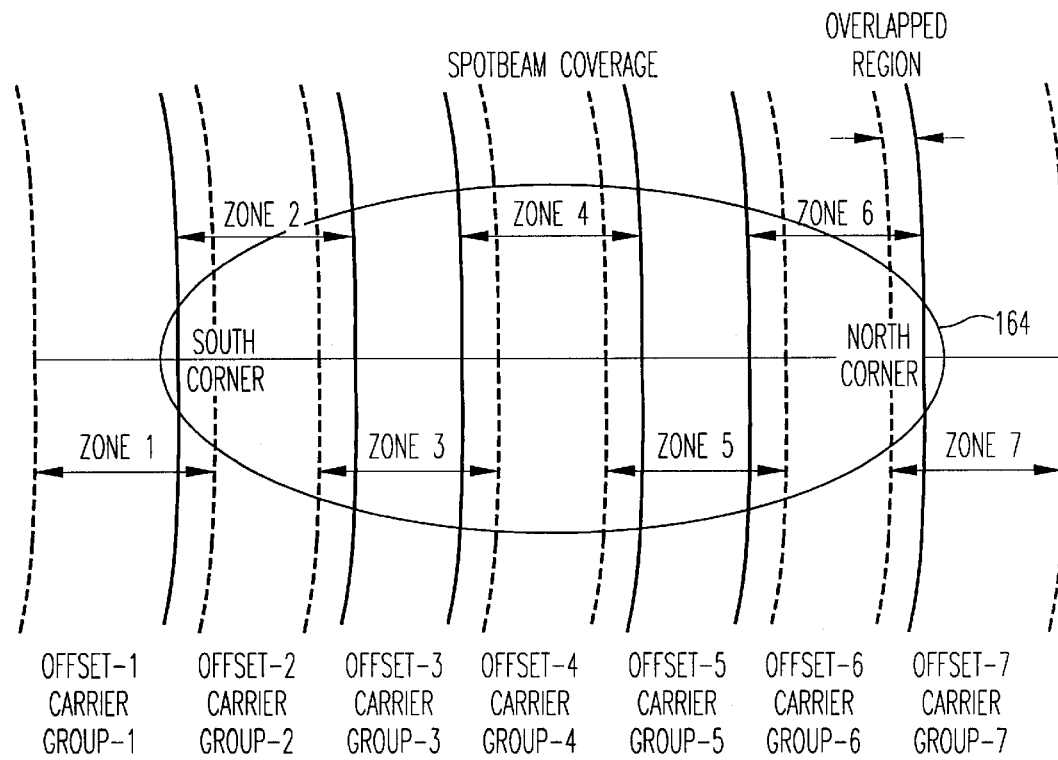
FIG. 5 is a diagram illustrating an example of a spot beam generated by a satellite in the network shown in FIG. 1, which is being segregated into a plurality of offset zones in accordance with an embodiment of the apparatus and method of the present invention.

In order to eliminate or at least minimize the occurrence of call blocking, the apparatus and method according to an embodiment of the present invention segregates a coverage area of the spot beam 136 into at least one offset zone, assigns a specific burst offset to each offset zone, and groups the carriers assigned to the spot beam into a number of groups corresponding to the number of offset zones, so that each carrier group can service the access terminals within its respective offset zone. The timing at which signal burst are transmitted between satellite 102 and access terminals within any offset zone will be set in accordance with the particular offset assigned to the zone. In the example shown in FIG. 5, the coverage area 164 of a spot beam 136 is segregated into seven offset zones Zone 1 through Zone 7, as indicated, which are each assigned a particular burst offset. The total number of carriers in the carrier resource pool available to the spot beam 136 are then allocated into seven carrier groups (i.e., group-1 through group-7) corresponding to Zone 1 through Zone 7, respectively. It is noted that neighboring offset zones overlap each other by a certain amount to avoid an abrupt change in the offset due to the relative motion between the satellite 102 and the access terminal 134 (e.g., if the access terminal 134 is moving).

The process of segregating the coverage area 164 and allocating the carriers accordingly is carried out by a computer in a traffic control subsystem (TCS) in the gateway station assigned to the access terminal 134 placing the call. For example, if an access terminal 134 is at a location assigned to the primary gateway station site 104, the processing is performed by a computer in the TCS in gateway station 112. However, if an access terminal 134 is at a location assigned to national gateway station site 122, the processing is performed by a computer in the TCS in gateway station 124.

As will now be exemplified, the segregating and carrier grouping is accomplished in accordance with the equations set forth below. In this example, it is assumed that the access terminal 134 is at a location assigned to the primary gateway station site 104 and thus, processing is performed by a computer in the TCS in gateway station 112.

Referring to FIG. 3, the duration of any frame (e.g., frame 140) is $T_f$ in milliseconds, and each frame has $N_s$ timeslots, with $N_s=T_f/T_s$. Each signal burst (e.g., signal burst 138) lasts for a duration of K timeslots. Accordingly, a signal burst length is represented by $T_{ch}=K \cdot T_s$ in milliseconds.

In addition, as discussed above, $k_d$ and $k_u$ represent the mobile downlink and uplink burst positions, respectively, which range from 0 to $N_s-1$ in a frame. Also, $t_{rm1}$ and $t_{rm2}$ represent start time and stop time, respectively, of receipt of signal burst 138 by the access terminal 134. Similarly, $t_{tm1}$ and $t_{tm2}$ represent start time and stop time, respectively, of transmission of signal burst 142 by the access terminal 134. The term $\Delta t_{os}$ represents the receiving/transmitting burst offset at the satellite 102, and $\Delta t_{os}$ represents the receiving/transmitting burst offset measured in timeslots of a frame. As also mentioned in the background section above, a time period in which a signal burst is transmitted by an access terminal 134 can not overlap a time period in which a signal burst is received by that access terminal 134. Furthermore, a guard time of $T_{gt}$ (in milliseconds) must be present with the signal bursts to permit the access terminal 134 to switch between transmitting and receiving modes.

Before being able to determine the number of offset zones into which the coverage area 164 should be divided, the processing being performed determines the maximum round-trip delay variation $R_z$ that will be permitted for each offset zone. The maximum round-trip delay variation means the maximum permissible difference in round-trip delay time between the access terminal in the offset zone having the smallest round-trip propagation delay time and the access terminal in the offset zone having the largest round-trip propagation delay time or, in other words, the maximum difference in round-trip propagation delay which would be experienced by access terminals at opposite ends of the offset zone.

In accordance with the present invention, the processing determines the maximum round trip delay variation $R_z$ based on the frame length $T_f$, the signal burst length $T_{ch}$, and the guard time $T_{gt}$. Specifically, the maximum round trip delay variation $R_z$ is determined in milliseconds according to the following equation:

$$R_z = T_f - 2(T_{ch}+T_{gt})$$

As will now be described, this equation is derived in accordance with such factors as the durations of the time frames, signal bursts and burst offset, as well as the position of the signal burst within their respective time frames, and the propagation delay between an access terminal (e.g., access terminal 134) and the satellite 102. As shown in FIG. 3, for exemplary purposes, the position of transmission frame 140 at the satellite is designated as frame n, and the position of receiving frame 144 at the satellite is designated as frame m. In this example, the difference between n and m is equal to "7" (i.e., seven frames). However, the difference between n and m can be set at any suitable integer value.

For purposes of the following equations, it will be assumed that frame n is the starting frame. However, the starting frame number has no consequence on the final results of the calculations. For a given terminal position with propagation delay $t_d$, if the reception/transmission burst offset at the satellite is $\Delta t_{os}=\Delta T_{os} \cdot T_s$, where $\Delta T_{os}$ is the offset measured in timeslots, and $T_s$ is the timeslot duration measured in ms, then the start time $t_{tm1}$ of the transmission burst at the terminal can be given by $$t_{tm1}=(m-n)T_f+k_dT_s-t_d+\Delta t_{os}$$

Therefore the propagation delay $t_d$ is a function of the transmission time $t_{tm1}$:

$$t_d=(m-n)T_f+k_dT_s+\Delta t_{os}-t_{tm1}$$

In order to meet the guard time requirements of the access terminal 134 which affords the access terminal 134 sufficient time to switch between the receiving and transmitting modes, enough guard time $T_{gt}$ must exist on both sides the signal burst (e.g., signal burst 142) being transmitted from the terminal 134. Assuming a single burst offset at the satellite 102 can support propagation delays in the range of $[t_{dz\ min}, t_{dz\ max}]$, then the range of $t_{tm1}$ can be given by the equations:

$$t_{tm1\ min} \leq t_{tm1} \leq t_{tm1\ max}$$

$$t_{tm1\ min}=t_{dz\ max}+k_dT_s+T_{ch}+T_{gt}$$

$$t_{tm1\ max}=t_{dz\ min}+T_f+k_dT_s-T_{ch}-T_{gt}$$

where $T_{ch}$ and $T_{gt}$ are the traffic burst duration and guard time duration, both measured in ms. Furthermore, because $$t_{dz\ max}=(m-n)T_f+k_dT_s+\Delta t_{os}-t_{tm1\ min}$$

$$t_{dz\ min}=(m-n)T_f+k_dT_s+\Delta t_{os}-t_{tm1\ max}$$

then in accordance with the above equations for $t_{tm1\ min}$ and $t_{tm1\ max}$, these equations become:

$$2t_{dz\ max}=(m-n)T_f+\Delta t_{os}-T_{ch}-T_{gt}$$

$$2t_{dz\ min}=(m-n)T_f+\Delta t_{os}+T_{ch}+T_{gt}-T_f$$

If it is then assumed that $R_z$ is the range of the equal offset zone measured in terms of the round trip delay variation, then $$R_z=2(t_{dz\ max}-t_{dz\ min})=T_f-2(T_{ch}+T_{gt})$$

as indicated above.

The processing performed in accordance with the present invention then assumes that the offset zones will be arranged such that one offset zone (e.g., Zone 4 in FIG. 5) overlaps location in the spot beam coverage area 164 at which an access terminal experiences a propagation delay mid-way between the maximum and minimum propagation delays for the coverage area 164 (i.e., the mid-delay point). The processing then assumes that all other offset zones will be symmetrically placed on both sides of the middle zone as shown, for example, in FIG. 2. If the range of propagation delay in the considered spot beam coverage area (i.e., spot beam coverage area 164) in milliseconds is assumed to be in accordance with the equation $$t_d \in [t_{d\ min}, t_{d\ max}]$$

then the total number of required burst offsets $N_{os}$ for that spot beam coverage area 164, which is equal to the total number of required offset zones, is determined as:

$$N_{os} = \begin{cases} 1 & \text{if } 2(t_{d\,max} - t_{d\,min}) \leq R_z \\ 1 + 2 \cdot ceil\left[\dfrac{(t_{d\,max} - t_{d\,min}) - R_z/2}{R_z - \Delta}\right] & \text{if } 2(t_{d\,max} - t_{d\,min}) > R_z \end{cases}$$

where $\Delta$ (in milliseconds) represents the overlap between two adjacent offset zones measured in terms of round trip differential delay, and the operation ceil takes the next highest integer of the result (e.g., ceil 4.1 equals 5) Hence, the processing can segregate the coverage area 164 into as few as a single offset zone, or as many offset zones as necessary in number of odd integers (e.g., 3, 5, 7 and so on). As discussed above, neighboring offset zones overlap each other by a certain amount to avoid an abrupt change in the offset due to the relative motion between the satellite 102 and the access terminal 134 (e.g., if the access terminal 134 is moving).

Once the processing has determined the number of offset zones needed for the spot beam coverage area 164, the processing determines the value of burst offset that should be assigned to each offset zone. The value of burst offset assigned to each offset zone is a function of the propagation delay which would be experienced by an access terminal at the center of the zone. Hence, assuming delay boundaries of the kth offset zone is $[t_{dz\,min}(k), t_{dz\,max}(k)]$ and $t_{dz0}(k)$ is the delay at the zone center, then $$t_{dz0}(k) = \frac{t_{dz\,min}(k) + t_{dz\,max}(k)}{2}$$

For a GEO mobile satellite system, the offset value $\Delta T_{os}(k)$ associated with the kth single offset zone can be given as $$\Delta T_{os}(k) = round\left[\frac{2t_{dz0}(k) - 6.5T_f}{T_s}\right] \quad -\frac{N_{os}-1}{2} \leq k \leq +\frac{N_{os}-1}{2}$$

where the operation round rounds to the nearest integer of the result (e.g., round 4.49 equals 4, while round 4.5 equals 5).

It is noted that for purposes of these equations, the value k=0 represents the offset zone which overlaps the mid-delay point of the spot beam coverage area 164. Accordingly, for the example shown in FIG. 5, Zone 4 is represented as the k=0 zone, Zone 1 is the k=−3 zone, and Zone 7 is the k=+3 zone.

The above offset zone equation is derived based on the following. First, the position of each offset zone in the spot beam coverage area 164 is determined. Then, for each offset zone, the offset is calculated based on the propagation delay in the center of that offset zone.

For example, assuming that $t_{dz0}(k)$ is the propagation delay from the satellite to the center of the kth single offset zone, and $[t_{dz\,min}(k), t_{dz\,max}(k)]$ is the offset zone delay boundary, then $$t_{dz0}(k) = [t_{dz\,min}(k) + t_{dz\,max}(k)]/2$$

If the satellite burst offset corresponding to the kth offset zone is $\Delta t_{os}(k)$ in milliseconds, then in accordance with the equations $$2t_{dz\,max} = (m-n)T_f + \Delta t_{os} - T_{ch} - T_{gt}$$
$$2t_{dz\,min} = (m-n)T_f + \Delta t_{os} + T_{ch} + T_{gt} - T_f$$

set forth above, $$\Delta t_{os}(k) = 2t_{dz0}(k) - \frac{2(m-n)-1}{2}T_f$$

To achieve frame/timeslot synchronization on the satellite 102, the offset $\Delta t_{os}(k)$ must be an integer of a timeslot duration. Then $\Delta T_{os}(k)$, the burst offset in number of timeslots, can be represented as $$\Delta T_{os}(k) = round\left[\left(2t_{dz0}(k) - \frac{2(m-n)-1}{2}T_f\right)\Big/T_s\right]$$

The operation round(x) takes the nearest integer around x. Also, in this example of a geo-stationary satellite constellation, m−n=7. Therefore $$\Delta T_{os}(k) = round[(2t_{dz0}(k) - 6.5T_f)/T_s]$$

as represented above. However, m−n can be any integer, depending on the manner in which the geo-stationary satellite constellation is set up.

The processing then determines the minimum and maximum propagation delay (i.e., the propagation delay boundaries) for each offset zone. Since the center of the middle zone (the k=0 zone) overlaps the mid-delay point of the spot beam coverage area 164, then the following equation is used to calculate the propagation delay at the center of each of the k offset zones:

$$t_{dz0}(k) = t_{d0} + \frac{k(R_z - \Delta)}{2} \quad k = -\frac{N_{os}-1}{2}, \ldots, 0, \ldots, +\frac{N_{os}-1}{2}$$

where $t_{d0}$ is the propagation delay at the mid-delay point of the coverage area 164. The delay boundaries $[t_{dz\,min}(k), t_{dz\,max}(k)]$ for each k offset zone is $$t_{dz\,min}(k) = t_{dz0}(k) - R_z/4$$
$$t_{dz\,max}(k) = t_{dz0}(k) + R_z/4$$

The processing also performs the carrier grouping operation to assign the carriers to service the offset zones. Since the carrier grouping operation and burst offset value determination operation are essentially independent of each other, either operation can be performed first, or both operations can be performed simultaneously.

As stated above, a number of carriers $N_c$ is assigned to each spot beam. The carrier grouping processing determines the total number of carrier groups and the total number of carriers in each group. The total number of carrier groups is equal to the number of offset zones $N_{os}$ or, in other words, each carrier group is assigned to one offset zone.

The total number of carriers in each group is determined in proportion to the number of users located in the corresponding offset zone. Hence, if P(k) is the probability that a given call is generated from the kth offset zone, then the number of carriers n(k) within the kth carrier group is $$n(k) = P(k) \cdot N_c$$

and $$N_c = \sum_k n(k)$$

with $$k \in \left[-\frac{N_{os}-1}{2}, +\frac{N_{os}-1}{2}\right].$$

The value P(k) can be derived from the geographical distribution of the users. For example, for a coverage area encompassing New York City and surrounding areas, a value of P(k) when k represents the number of the offset zone servicing Manhattan in far greater than the value of P(k) when k represents the number of the offset zone covering a less populated area.

Once the offset zones and corresponding burst offsets have been determined, and the carrier groups have been established in accordance with the above processing, the network 100 can service calls to and from the access terminals. When a call is being made by an access terminal or to an access terminal, the TCS in the appropriate gateway station (in this example, gateway station 112) performs the following processes to set up the call.

Assuming that access terminal 134 is initiating the call, the propagation delay $t_d$ for access terminal 134 is determined in a manner de scribed above as related to the location of the access terminal within a spot beam coverage area (e.g., spot beam coverage area 164) as measured by the gateway station 112. The kth carrier group is considered to be the preferred carrier group for this call if the following condition can be met:

$$t_{min}(k) \leq t_d \leq t_{max}(k)$$

$$t_{min}(k) = t_{dz\ min}(k) + \Delta/2$$

$$t_{max}(k) = t_{dz\ max}(k) - \Delta/2$$

with the variables $t_{dzmin}(k)$ and $t_{dzmax}(k)$ representing the propagation delay boundaries for the kth offset zone, and $\Delta$ (in milliseconds) representing the overlap between two adjacent offset zones measured in terms of round trip differential delay, as discussed above.

Once the preferred carrier group for this access terminal 134 has been determined, the burst offset $\Delta T_{os}(k)$ which is calculated for that carrier group is assigned as the transmission/reception burst offset for that terminal. The processing then searches for a pair of free channels to assign to the access terminal 134 for signal burst transmission and reception. That is, as described above, the access terminal 134 uses one channel of a transmission carrier to transmit signal bursts to satellite 102, and uses one channel of a reception carrier to receive signal bursts from the satellite 102.

If a pair of free channels is found on carriers assigned to the preferred carrier group, these channels are assigned to the access terminal 134 and communication between the network 100 and access terminal 134 is established on these channels. However, if a pair of free channels is not available in the preferred carrier group, the processing performed by the TCS in gateway station 112 will search the entire carrier resource pool available to the spot beam for a pair of available channels. If a pair of free channels are then located on a pair of carriers assigned to another carrier group, the processing determines whether the access terminal 134 can use this channel based on the following equations:

$$(7t_f + k_u t_s - t_d) - (t_d + k_d t_s + K \cdot t_f + t_{ch}) \geq 1.5 t_s$$

and $$[t_d + k_d t_s + (K+1)t_f] - [7t_f + k_u t_s + t_{ch} - t_d] \geq 1.5 t_s$$

where $$K = \text{floor}\{[(k_u t_s + 7t_f - t_d) - (k_d t_s + t_d)]/t_f\}$$

with the operation floor taking the next lowest integer of the result (e.g.,floor 4.9 equals 4). If the above equations are satisfied, the offset provided by the channel pair will enable the signal bursts to reach the satellite and access terminals at the appropriate times while also avoiding collision with other signal bursts being transmitted and received by any other access terminal. If so, then the processing causes gateway station 112 to assign this channel pair to the access terminal 134. However, if the transmission and reception timing would not be appropriate, or if signal burst collision would occur, then the processing keeps searching for another available pair of channels to assign to the access terminal 134 until a suitable channel pair is located.

Figure 6:
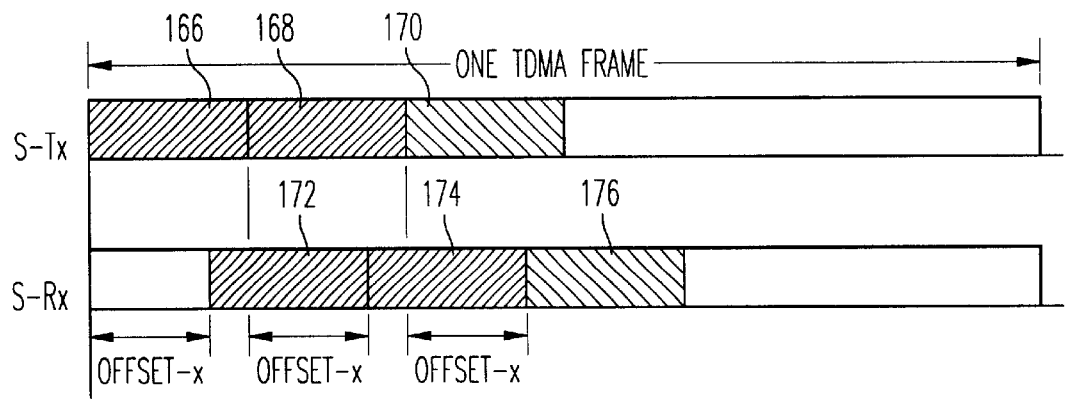
FIG. 6 illustrates an example of a TDMA frame including a plurality of time-multiplexed signal bursts transmitted from a satellite in the network shown in FIG. 1 over a carrier to a plurality of access terminals in relation to a TDMA frame including a plurality of time-multiplexed signal bursts transmitted over another carrier in accordance with the same burst offset from the plurality of access terminals to the satellite.

As discussed above, by segregating a spot beam coverage area 164 into a suitable number of offset zones, and by grouping the available carriers accordingly in the manner described above, the network 100 is capable of efficiently distributing burst offsets in the TDMA frames being transmitted and received to and from the access terminals and satellite 102. FIG. 6, for example, illustrates the relationship between signal burst 166, 168 and 170 being transmitted from satellite 102 over carrier S-Tx to three access terminals within a single offset zone defined in the above manner, and the relationship between signal bursts 172, 174 and 176 being transmitted from those three access terminals over carrier S-Rx back to the satellite 102. As indicated, the signal bursts are transmitted from each of the access terminals in accordance with the same transmission/reception offset (i.e., offset-n). Accordingly, no unused timeslots are present between any of the signal bursts 172, 174 and 176.

Figure 7:
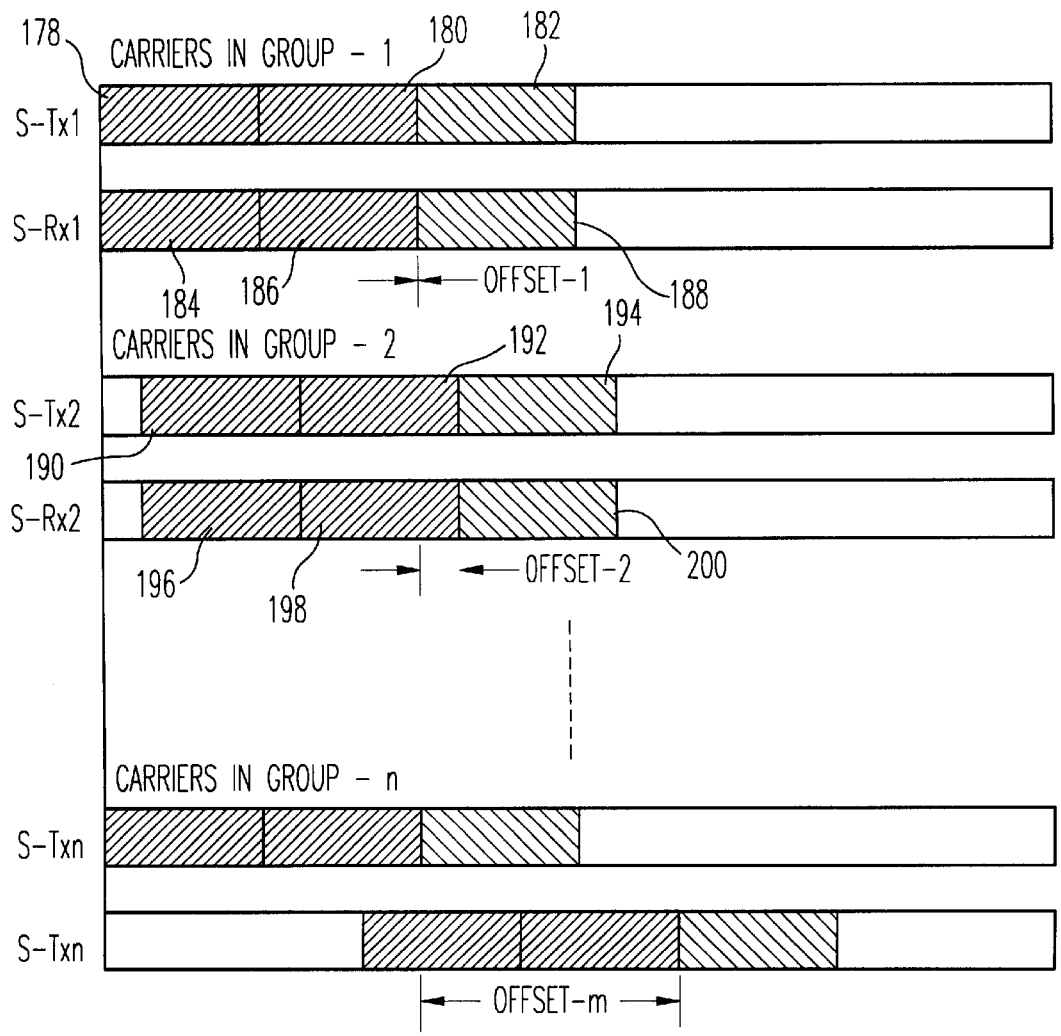
FIG. 7 illustrates an example of the burst offsets assigned to each group of carriers associated with the respective offset zones illustrated in FIG. 5 in accordance with an embodiment of the present invention.

As shown more particularly in FIG. 7, signal bursts are transmitted and received over any carrier pair in a carrier group assigned to a respective offset zone in accordance with the transmission/reception burst offset designated for that offset zone. As indicated, signal bursts 178, 180 and 182 are transmitted from satellite 102 over carrier S-Tx1 to three access terminals within Zone 1, and signal bursts 184, 186 and 188 are transmitted over carrier S-Rx1 from these three access terminals to the satellite 102 in accordance with the same transmission/reception burst offset Offset-1. Similarly, signal bursts 190, 192 and 194 are 30 transmitted from satellite 102 over carrier S-Tx2 to three access terminals within Zone 2, and signal bursts 196, 198 and 200 are transmitted over carrier S-Rx2 from these three access terminals to the satellite 102 in accordance with the same transmission/reception burst offset Offset-2. The timing of transmission and reception of signal bursts to and from access terminals in all offset zones up to Zone n is performed in accordance with the transmission/reception offset designated for each specific zone. Accordingly, no unused timeslots are present between any of the signal bursts distributed in any of the TDMA timeframes TDMA-Rx-1 through TDMA-Rx-n in which signal bursts are transmitted to the satellite 102. Hence, the occurrence of call blocking is minimized or essentially eliminated.

Figure 8:
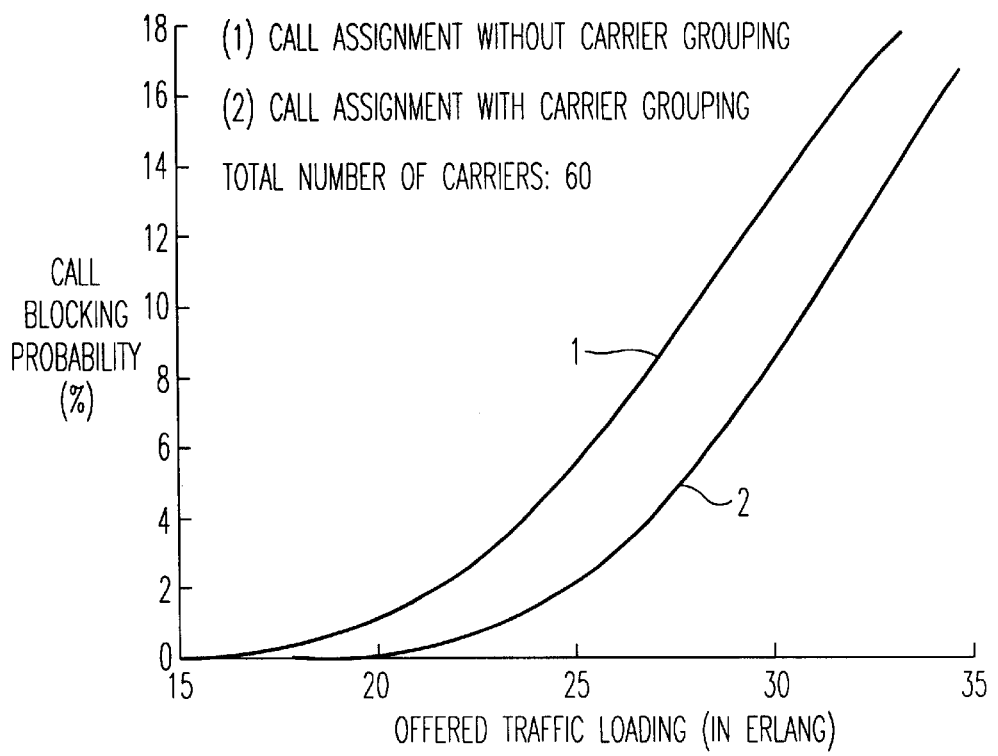
FIG. 8 is a graph illustrating the percentage of call blocking probability in relation to call traffic for a spot beam having 9 available carriers in which carrier grouping according to an embodiment of the present invention has been performed versus the percentage of call blocking probability in relation to call traffic for the identical spot beam in which no carrier grouping has been performed.
Figure 9:
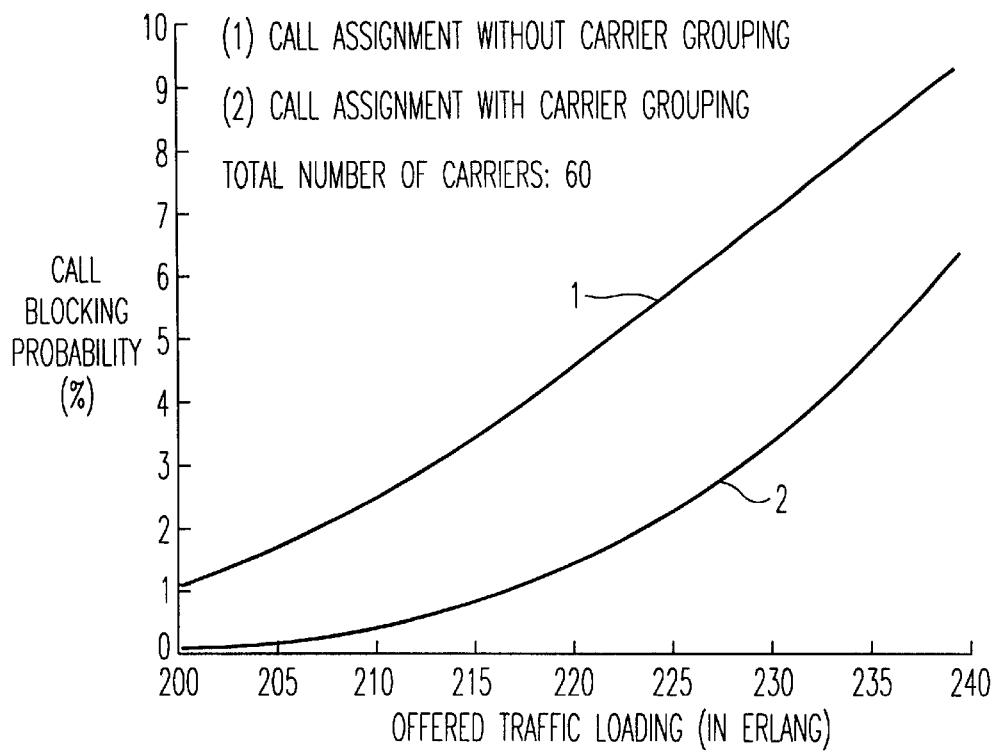
FIG. 9 is a graph illustrating the percentage of call blocking probability in relation to call traffic for a spot beam having 60 available carriers in which carrier grouping according to an embodiment of the present invention has been performed versus the percentage of call blocking probability in relation to call traffic for the identical spot beam in which no carrier grouping has been performed.

The benefit of performing zone allocation and carrier grouping as described above can be more readily appreciated from the graphs shown in FIGS. 8 and 9, which illustrate the estimated probability of call blocking that may occur for different traffic resource pools of carriers when the above zone allocation and carrier grouping is and is not performed. In these examples, the frame duration is estimated as $T_f=40$ ms, timeslot duration is estimated as $T_s=1.67$ ms, and each frame includes 24 timeslots. Each signal burst occupies 6 contiguous timeslots, so the number of traffic channels contained in each carrier is 4. Each access terminal is assumed to have a half-diplexer where the guard time required between Tx and Rx bursts is $T_{gt}=1.5T_s=2.5$ ms. The spot beam has an angle of 0.7 degree seen from the satellite. With 15 degree beam elevation angle, 5.3 degree satellite inclination angle and 50% beam coverage extension (due to beam pointing error and mobile terminal beam selection error), the round trip differential delay across the beam is around 25.0 ms. Adjacent offset zones are assumed to be overlapped by one timeslot (A=1.67 ms). Therefore, in accordance with the above equations, this spot beam coverage area is segregated into three offset zones. Hence, the traffic resource pool of carriers is divided into 3 carrier groups.

The graph shown in FIG. 8 illustrates the estimated probability of call blocking when the spot beam has a resource pool of 9 carrier pairs and traffic loading is simulated from 15 to 35 Erlang. The graph shown in FIG. 9 illustrates the estimated probability of call blocking when the spot beam has a resource pool of 60 carrier pairs and traffic loading is simulated from 200 to 240 Erlang. In each example, it is clear that the use of zone allocation and carrier grouping in accordance with the present invention significantly reduces call blocking probability in the whole range of the simulated traffic loading. It is also clear that less call blocking occurs for spot beams having larger traffic resource pools. The zone allocation and carrier grouping process is especially effective for spot beams with large beam size and low beam elevation angle, since delay spread within those beams is generally very large. In addition, the process is especially effective for a GEO satellite constellation, since it is easier for such a system to implement a fixed satellite burst.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An apparatus, for use in a satellite-based communications network, for grouping a plurality of carriers of a carrier resource pool assigned to a spot beam generated by a satellite in said network, and over which signal bursts are transmitted between said satellite and at least one user terminal located in a coverage area of said spot beam, said apparatus comprising:
a spot beam segregator which segregates said coverage area into at least one offset zone based on respective propagation time periods required for signals to travel between said satellite and respective different locations in said coverage area; and
a carrier grouper which groups said carriers into an amount of carrier groups corresponding to an amount of said at least one offset zone, and assigns each of said carrier groups to service a respective one of said at least one offset zone.

2. An apparatus as claimed in claim 1, wherein:
said spot beam segregator segregates said coverage area into a plurality of offset zones; and
said carrier grouper groups said carriers into a plurality of carrier groups corresponding to said plurality of offset zones, and assigns each of said carrier groups to a respective one of said offset zones.

3. An apparatus as claimed in claim 1, wherein:
said spot beam segregator segregates said coverage area into a plurality of offset zones, such that each said offset zone includes a portion of at least one adjacent offset zone.

4. An apparatus as claimed in claim 1, wherein:
said spot beam segregator segregates said coverage area into an amount of offset zones equal to a positive integer greater than one, such that one of said offset zones includes a mid-delay point of said coverage area, and the other of said offset zones are equally distributed on opposite sides of said one of said offset zones, said mid-delay point representing a location in said coverage area at which an amount of propagation time required for a signal to travel between said mid-delay point and said satellite has a value midway between a maximum value representing a maximum amount of propagation time required for a signal to travel between a first location in said coverage area and said satellite and a minimum value representing a minimum amount of propagation time required for a signal to travel between a second location in said coverage area and said satellite.

5. An apparatus as claimed in claim 1, wherein:
said spot beam segregator segregates said coverage area into a single offset zone; and
said carrier grouper groups said carriers into a single carrier group and assigns said carrier group to said single offset zone.

6. An apparatus as claimed in claim 1, wherein:
said spot beam segregator segregates said coverage area based on at least one of a maximum propagation time required for a signal to travel between said satellite and a first location in said coverage area and a minimum propagation time required for a signal to travel between said satellite and a second location in said coverage area.

7. An apparatus as claimed in claim 1, further comprising:
a burst offset assignor which assigns a respective burst offset to each respective said offset zone, each said respective burst offset representing a period of time required between a start of transmission of a signal burst by said satellite to a user terminal over a carrier in said carrier group assigned to said respective offset zone and a start of reception by said satellite of a signal burst transmitted by said user terminal over another carrier in said carrier group.

8. An apparatus as claimed in claim 1, wherein:
said carrier grouper groups a respective amount of said carriers into each of said respective carrier groups based on respective values assigned to said offset zone, each of said values representing an amount of user terminals adapted for use in said respective offset zone.

9. An apparatus, for use in a satellite-based communications network, for setting timings at which signal bursts are transmitted between a satellite in said network and at least one user terminal in a coverage area of a spot beam generated by said satellite, said apparatus comprising:
a spot beam segregator which segregates said coverage area into at least one offset zone based on respective propagation time periods required for signals to travel between said satellite and respective different locations in said coverage area; and
a burst offset assignor which assigns a respective burst offset to each respective said offset zone, each said respective burst offset representing a period of time required between a start of transmission of a signal burst by said satellite to a user terminal located in said respective offset zone and a start of reception by said satellite of a signal burst transmitted by said user terminal in said respective offset zone.

10. An apparatus as claimed in claim 9, wherein:

said spot beam segregator segregates said coverage area into a plurality of offset zones.

11. An apparatus as claimed in claim 10, wherein:

each said offset zone includes a portion of at least one adjacent offset zone.

12. An apparatus as claimed in claim 9, wherein:

said spot beam segregator segregates said coverage area into an amount of offset zones equal to a positive integer greater than one, such that one of said offset zones includes a mid-delay point of said coverage area, and the other of said offset zones are equally distributed on opposite sides of said one of said offset zones, said mid-delay point representing a location in said coverage area at which an amount of propagation time required for a signal to travel between said mid-delay point and said satellite has a value midway between a maximum value representing a maximum amount of propagation time required for a signal to travel between a first location in said coverage area and said satellite and a minimum value representing a minimum amount of propagation time required for a signal to travel between a second location in said coverage area and said satellite.

13. An apparatus as claimed in claim 9, wherein:

said spot beam segregator segregates said coverage area into a single offset zone.

14. An apparatus as claimed in claim 9, wherein:

said spot beam segregator segregates said coverage area based on at least one of a maximum propagation time required for a signal to travel between said satellite and a first location in said coverage area and a minimum propagation time required for a signal to travel between said satellite and a second location in said coverage area.

15. A method for grouping a plurality of carriers of a carrier resource pool assigned to a spot beam generated by a satellite in a satellite-based communications network, and over which signal bursts are transmitted between said satellite and at least one user terminal located in a coverage area of said spot beam, said method comprising the steps of:

segregating said coverage area into at least one offset zone based on respective propagation time periods required for signals to travel between said satellite and respective different locations in said coverage area;

grouping said carriers into an amount of carrier groups corresponding to an amount of said at least one offset zone; and assigning each of said carrier groups to service a respective one of said at least one offset zone.

16. A method as claimed in claim 15, wherein:

said segregating step segregates said coverage area into a plurality of offset zones;

said grouping step groups said carriers into a plurality of carrier groups corresponding to said plurality of offset zones; and said assigning step assigns each of said carrier groups to a respective one of said offset zones.

17. A method as claimed in claim 15, wherein:

said segregating step segregates said coverage area into a plurality of offset zones, such that each said offset zone includes a portion of at least one adjacent offset zone.

18. A method as claimed in claim 15, wherein:

said segregating step segregates said coverage area into an amount of offset zones equal to a positive integer greater than one, such that one of said offset zones includes a mid-delay point of said coverage area, and the other of said offset zones are equally distributed on opposite sides of said one of said offset zones, said mid-delay point representing a location in said coverage area at which an amount of propagation time required for a signal to travel between said mid-delay point and said satellite has a value midway between a maximum value representing a maximum amount of propagation time required for a signal to travel between a first location in said coverage area and said satellite and a minimum value representing a minimum amount of propagation time required for a signal to travel between a second location in said coverage area and said satellite.

19. A method as claimed in claim 15, wherein:

said segregating step segregates said coverage area into a single offset zone;

said grouping step groups said carriers into a single carrier group; and said assigning step assigns said carrier group to said single offset zone.

20. A method as claimed in claim 15, wherein:

said segregating step segregates said coverage area based on at least one of a maximum propagation time required for a signal to travel between said satellite and a first location in said coverage area and a minimum propagation time required for a signal to travel between said satellite and a second location in said coverage area.

21. A method as claimed in claim 15, further comprising a step of:

assigning a respective burst offset to each respective said offset zone, each said respective burst offset representing a period of time required between a start of transmission of a signal burst by said satellite to a user terminal over a carrier in said carrier group assigned to said respective offset zone and a start of reception by said satellite of a signal burst transmitted by said user terminal over another carrier in said carrier group.

22. A method as claimed in claim 15, wherein:

said grouping step groups a respective amount of said carriers into each of said respective carrier groups based on respective values assigned to said offset zone, each of said values representing an amount of user terminals adapted for use in said respective offset zone.

23. A method for setting timings at which signal bursts are transmitted between a satellite in a satellite-based communications network and at least one user terminal in a coverage area of a spot beam generated by said satellite, said method comprising the steps of:

segregating said coverage area into at least one offset zone based on respective propagation time periods required for signals to travel between said satellite and respective different locations in said coverage area; and assigning a respective burst offset to each respective said offset zone, each said respective burst offset representing a period of time required between a start of transmission of a signal burst by said satellite to a user terminal located in said respective offset zone and a start of reception by said satellite of a signal burst transmitted by said user terminal in said respective offset zone.

24. A method as claimed in claim 23, wherein:

said segregating step segregates said coverage area into a plurality of offset zones.

25. A method as claimed in claim 24, wherein:

each said offset zone includes a portion of at least one adjacent offset zone.

26. A method as claimed in claim 23, wherein:

said segregating step segregates said coverage area into an amount of offset zones equal to a positive integer greater than one, such that one of said offset zones includes a mid-delay point of said coverage area, and the other of said offset zones are equally distributed on opposite sides of said one of said offset zones, said mid-delay point representing a location in said coverage area at which an amount of propagation time required for a signal to travel between said mid-delay point and said satellite has a value midway between a maximum value representing a maximum amount of propagation time required for a signal to travel between a first location in said coverage area and said satellite and a minimum value representing a minimum amount of propagation time required for a signal to travel between a second location in said coverage area and said satellite.

27. A method as claimed in claim 23, wherein:

said segregating step segregates said coverage area into a single offset zone.

28. A method as claimed in claim 23, wherein:

said segregating step segregates said coverage area based on at least one of a maximum propagation time required for a signal to travel between said satellite and a first location in said coverage area and a minimum propagation time required for a signal to travel between said satellite and a second location in said coverage area.

* * * * *